United States Patent [19]

Percival et al.

[11] Patent Number: 4,602,614
[45] Date of Patent: Jul. 29, 1986

[54] HYBRID SOLAR/COMBUSTION POWERED RECEIVER

[75] Inventors: Worth H. Percival, Oakton; David N. Wells, Arlington, both of Va.

[73] Assignee: United Stirling, Inc., Alexandria, Va.

[21] Appl. No.: 556,571

[22] Filed: Nov. 30, 1983

[51] Int. Cl.[4] .............................................. F24J 3/02
[52] U.S. Cl. ................................... 126/427; 126/448; 126/450; 60/641.8; 60/641.13; 60/641.14
[58] Field of Search ............... 126/435, 427, 448, 450; 60/517, 524, 676, 641.8, 641.13, 641.14

[56] References Cited

U.S. PATENT DOCUMENTS

| | | | |
|---|---|---|---|
| 2,874,543 | 2/1959 | Culver | 60/676 |
| 3,861,146 | 1/1975 | Lynch et al. | 60/524 |
| 3,927,659 | 12/1975 | Blake et al. | 126/271 |
| 3,942,324 | 3/1976 | Johansson et al. | 60/524 X |
| 4,044,559 | 8/1977 | Kelly | 60/517 X |
| 4,069,670 | 1/1978 | Bratt et al. | 60/517 |
| 4,078,548 | 3/1978 | Kapany | 126/271 |
| 4,079,591 | 3/1978 | Derby et al. | 126/451 |
| 4,085,588 | 4/1978 | Reams et al. | 60/517 |
| 4,277,942 | 7/1981 | Egnell et al. | 60/517 |
| 4,345,426 | 8/1982 | Egnell et al. | 60/517 |
| 4,345,645 | 8/1982 | Bratt . | |
| 4,389,844 | 6/1983 | Ackermann et al. | 60/517 |
| 4,395,879 | 8/1983 | Berntell . | |
| 4,398,391 | 8/1983 | English, Jr. | 60/676 X |
| 4,414,812 | 11/1983 | Parry | 126/427 |
| 4,509,333 | 4/1985 | Nussdorfer el al. | 60/641.14 X |

OTHER PUBLICATIONS

"Dish Stirling Solar Receiver Program Final Report", Doc. No. ER 79917-3, Dec. 15, 1980, including pp. i–ix, 1–16, enclosure pp. 1–4 of ER 79917-2 (12/5/80) and Dwg. No. 79917001.
Chubb, "Solar Energy", vol. 23, pp. 217–221, 1979, FIGS. 1 and 2.

*Primary Examiner*—Samuel Scott
*Assistant Examiner*—Carl D. Price
*Attorney, Agent, or Firm*—Finnegan, Henderson, Farabow, Garrett & Dunner

[57] ABSTRACT

An improved hybrid solar/combustion powered receiver, for use e.g. with a hot gas engine, the receiver being of the type having a housing and an aperture for admitting solar radiation to the cavity defined by the housing. The improved receiver includes a heat exchanger within the cavity and having the tubes tangentially spaced; multiple burners for providing a combustion gas flow path during combustion powered operation between and around the portions of the tubes upon which solar radiation impinges; and a fused silica, internally mounted window to seal the aperture against combustion gas leakage out of the receiver.

1 Claim, 2 Drawing Figures

HYBRID SOLAR/COMBUSTION POWERED RECEIVER

BACKGROUND OF THE INVENTION

1. Field of the Invention

The present invention relates to an improved hybrid solar/combustion powered receiver for providing thermal energy for use such as, for example, by a hot gas engine.

2. Description of the Prior Art

"Solar only" receivers typically function to convert solar radiation to heat energy for use, for instance, in hot gas engines e.g. of the Rankine, Stirling, or Brayton types or another apparatus requiring thermal energy input. "Hybrid" receivers typically have the solar energy input augmented and/or supplanted by an auxilliary energy source, such as combustion of natural gas, for use during periods of darkness or periods of low insolation (e.g. cloudy days).

A conventional hybrid solar/gas powered receiver is that proposed in the "Dish Stirling Solar Receiver Program Final Report", document No. ER 79917-3, Dec. 15, 1980, drawing No. 79917001. That receiver included a generally cylindrical insulated housing with an aperture at one axial end and a conical heat exchanger at the other axial end. The heat exchanger, in particular, was formed from a plurality of tubes partially imbedded in a gas-impermeable solid metal substrate to form the conical heat exchanger against which the solar radiation impinged. A plurality of gas burners were mounted in the housing wall to direct hot combustion gases to impinge on the rear, or un-illuminated, side of the conical heat exchanger, and between portions of the heater tubes connecting the regenerator to the conical heat exchanger. In this prior art hybrid receiver, the conical heat exchanger itself prevented the escape of combustion gases through the aperture during gas power operation. Also, the subject prior art hybrid solar receiver was used in conjunction with a Stirling-type hot gas engine for the conversion of the thermal energy into mechanical power.

Several of the shortcomings with the subject prior art hybrid receiver were thermal stress cracking of the heater tubes imbedded in the solid metal substrate, which was induced by the extreme rigidity of the solid conical heat exchanger design and poor heat transfer from the combustion gases during gas power operation. The present invention attempts to overcome these problems by providing a hybrid receiver having good combustion gas heat transfer characteristics, as well as good solar radiation heat transfer characteristics, while continuing to prevent the escape of combustion gases and the resulting loss of overall receiver efficiency.

SUMMARY OF THE INVENTION

In accordance with the invention, as embodied and broadly described herein, the improvement in a hybrid solar/gas powered receiver of the type having an insulated housing, a heat exchanger for extracting heat energy out of the receiver, the insulated housing surrounding the heat exchanger and forming a receiver cavity, the housing also including an aperture for admitting solar radiation to the cavity to impinge upon the heat exchanger, and a plurality of gas burners to provide combustion gases within the receiver, comprises the heat exchanger being formed from a plurality of individual heater pipes arranged in a generally conical array and being spaced apart, the axis of the conical heater pipe array being in line with the aperture; the gas burners being positioned for inducing a flow of combustion gases within the receiver cavity between substantially the entire portion of the length of each of the individual spaced apart heater pipes of the conical array upon which the solar radiation impinges; and means for preventing thermal energy losses from the cavity resulting from the escape of combustion gases through the aperture during gas power operation.

Preferably, the thermal energy convection preventing means includes window means for sealing the aperture while transmitting solar radiation.

The accompanying drawing which is incorporated in, and constitutes a part of, this specification, illustrates one embodiment of the invention and, together with the description, serves to explain the principles of the invention.

Reference will now be made in detail to the present preferred embodiment of the invention, examples of which are illustrated in the aforesaid drawing.

DESCRIPTION OF THE PREFERRED EMBODIMENT

Figure 1:
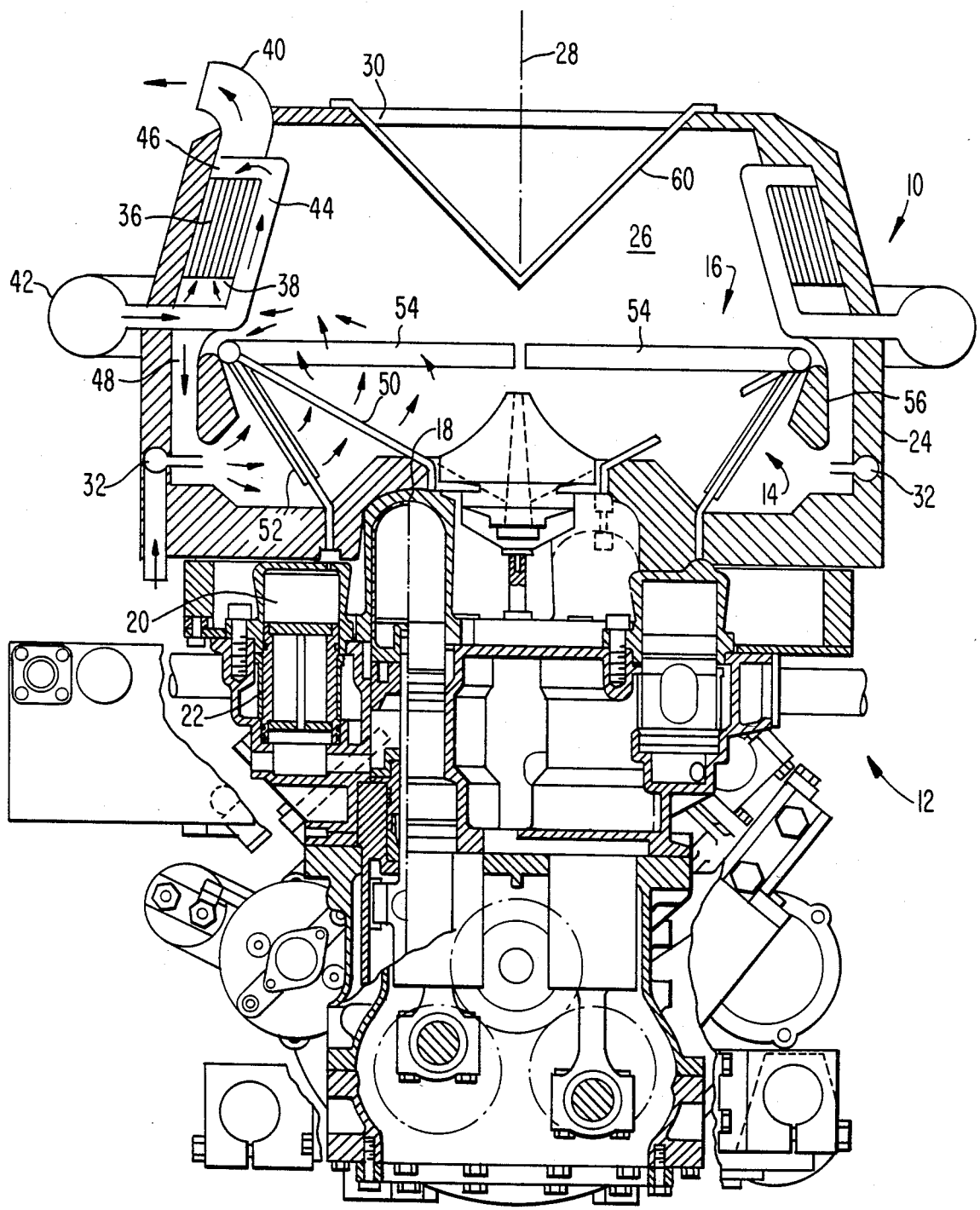
FIG. 1 is a schematic cross-section of an improved hybrid solar/gas powered receiver made in accordance with the present invention and shown being utilized in conjunction with a hot gas engine of the Stirling type.

FIG. 1 shows an improved hybrid solar/gas powered receiver 10 made in accordance with the present invention and depicted as connected to a hot gas engine 12 for utilization of the thermal energy produced by the receiver 10. Hot gas engine 12 is of the double acting Stirling type wherein a plurality of working gas charges are confined in variable volume chambers between pairs of cylinders having pistons reciprocating out of phase. Engine 12 includes heater head 14 which further includes tube assembly 16 which carries the working gas charges between the cylinder, such as cylinder 18, to a respective regenerator-cooler assembly, such as regenerator-cooler assembly 20, 22, and to another cylinder (not shown). A conical heat exchanger, e.g., heater head 14, functions as the heat exchanger for receiver 10 to transfer heat out of the receiver into the working gas charges of engine 12. Tube assembly 16 is in a conical shape to provide a surface for direct impingement of solar radiation, as will be apparent from the succeeding discussion. Detailed descriptions of such concial heat exchanger assemblies used heretofore in solar only applications are presented in U.S. Pat. Nos. 4,345,645 and 4,395,879.

The improved solar receiver of the present invention is not restricted to use with a hot gas engine, or to use with a hot gas engine of the Stirling type, as other apparatus for utilizing the converted thermal energy can be employed and other engine types (e.g. Rankine, Brayton, etc.) can be used.

As depicted in FIG. 1, hybrid receiver 10 includes a generally cylindrical insulated housing 24 surrounding heater head 14 and defining receiver cavity 26 and receiver center line 28. An aperture such as circular aperture 30 is provided in cylindrical housing 24 at one axial end to admit solar radiation such as, e.g., from a parabolic dish collector-concentrator (not shown), and heater head 14 is located at the opposite axial end of housing 24. Aperture 30 is shown coaxial with the conical heater head 14 and cylindrical housing 24.

Hybrid receiver 10 also includes apparatus for providing combustion heat powered operation including a plurality of tangentially positioned gas burners 32 fed from a gas source (not shown) and receiving combustion air from a preheater assembly. The preheater assembly includes an annular, stacked plate counter flow heat exchanger 36 mounted in the upper portion of housing 24 and configured to receive combustion gases from cavity 26 at exhaust inlet 38 and to reject exhaust gases at exhaust exit 40. Combustion air flows from circular air plenum 42 positioned outside housing 24 to a double walled inner air plenum 44 positioned between heat exchanger 36 and cavity 26 and then to combustion air inlet 46. After absorbing heat values from the combustion gases in heat exchanger 36, the heated combustion air flows to gas burners 32 via duct 48. In this arrangement, combustion air is preheated to some extent in the inner plenum 44, which is heated partially by the solar flux which may spill over beyond the outside diameter of the main engine heat exchanger. The combustion air is also heated during passage through the stacked plate assembly 36.

In accordance with the present invention, the improved hybrid receiver has the main heat exchanger formed from a plurality of individual heater pipes configured in a conical array with the tubes being spaced apart in a tangential direction relative to the receiver centerline. As embodied herein, heater head 14 which constitutes the main heat exchanger for hybrid receiver 10, is fabricated with spaces between the individual tubes of tube assembly 16 to allow sufficient flow area for the passage of combustion gases between the tubes.

In FIG. 1, tube assembly 16 shows a plurality of tubes 50 leading to each hot gas engine cylinder and a plurality of tubes 52 leading to the respective regenerator-cooler assembly. A series of working gas plenums 54 connect all tubes 50 and 52 associated with a particular working gas charge. Collectively, plenums 54 form a complete ring shaped annulus, and collectively, tubes 50 comprise a complete conical array. Tubes 50 are those which receive the predominant fraction of directly impinging radiation through aperture 30, as can be appreciated from the orientation depicted in FIG. 1. However, tubes 52 can be positioned to lie tangentially between individual tubes 50 to allow direct impingement of some solar radiation from aperture 30 on tubes 52, as long as tubes 52 do not block the flow of combustion gases between tubes 50.

In accordance with the present invention, the gas burners of the improved hybrid solar/gas powered receiver are positioned to direct the hot combustion gases over and between substantially the entire portion of the length of each of the spaced apart heater pipes of the conical array upon which solar radiation impinges. This is an important feature because to maximize efficiency during solar operation, the predominant portion of the overall tube length should be in position to receive solar radiation by direct impingement. To provide good efficiency during combustion powered operation, the predominant portion of the overall tube length should be in a position to be in contact with the hot combustion gases.

As embodied herein, and as shown in FIG. 1, gas burners 32 of hybrid receiver 10 are mounted radially outside of tube assembly 16 and oriented to provide a radially and tangentially inward flow of combustion gases to the portion of cavity 26 located behind tube assembly 16, relative to the location of aperture 30. The combustion gases flow past tubes 52, which can be finned to promote heat transfer, and then, importantly, between and around tubes 50, and finally to the front part of cavity 26 and to preheater exhaust inlet 38. An annular-shaped interior part 56 of housing 24 is positioned closely adjacent plenum 54 to prevent short-circuiting of this flow path within cavity 26.

In accordance with the present invention, the improved hybrid receiver further is provided with means for sealing the aperture against thermal convection losses during combustion powered operation. Without such sealing means, the relatively high (compared to natural circulation) currents induced by the high velocity, high temperature combustion system could result in unacceptable thermal leakage out of the receiver through the aperture, bypassing any means such as a preheater assembly to recover the heat in the exhaust gases.

As embodied herein, and with continued reference to FIG. 1, aperture 30 is sealed by window 60 which is formed from a plurality of triangular planar members, configured in the shape of an inverted pyramid, and made of fused silica (quartz) or an equivalent high temperature transparent material. Window 60 is positioned almost entirely within cavity 26 in an inverted orientation to recover through multiple reflections some of the solar radiation reflected from the inner surface of window 60. Although other convection loss preventing means, including flat windows mounted in the plane of aperture 30, are contemplated by the present invention, internally mounted windows capable of intercepting reflected radiation such as window 60 are highly preferred.

Figure 2:
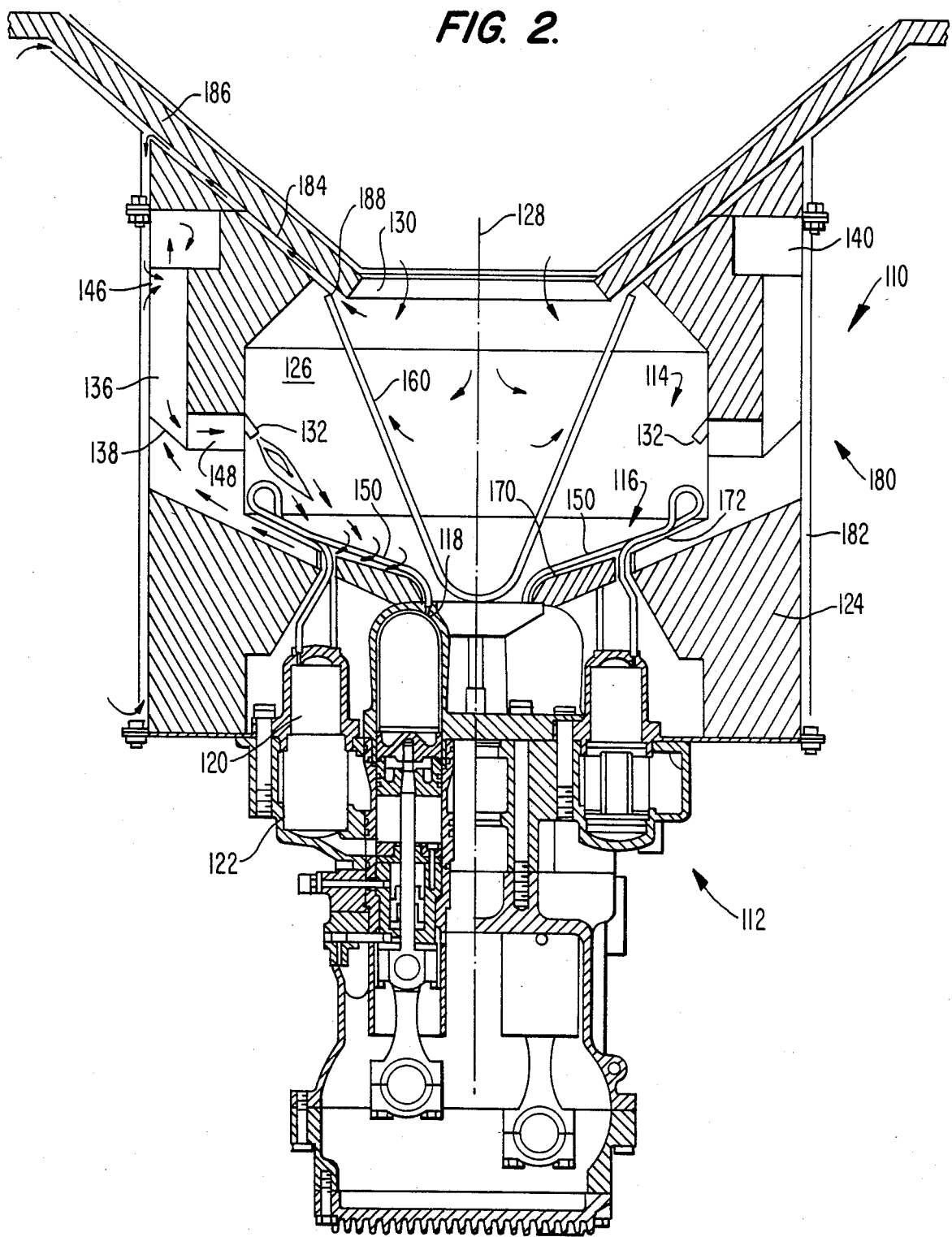
FIG. 2 is a variation of the improved hybrid receiver embodiment shown in FIG. 1.

FIG. 2 shows a variation of the hybrid receiver depicted in FIG. 1, and the hybrid receiver of FIG. 2 is designated generally by the numeral 110 and the Stirling engine connected thereto by the numeral 112. Elements of receiver 110 and engine 112 which correspond to structurally similar elements of the hybrid receiver and engine pictured in FIG. 1 have the same reference numerals, but in a 100 number series.

As compared to the embodiment in FIG. 1, the hybrid receiver in the FIG. 2 embodiment has tube assembly 116 of engine heater head 114 composed of a plurality of individual continuous spaced apart tubes 150 without internal working gas plenums and return tubes. The portion of each of tubes 150 nearest the respective regenerator-cooler assembly is shielded by parts of housing 124 from the flow of combustion gases, but the remainder, constituting the major part of the tube length, is arranged within the conical array facing the aperture for receiving directly inpinging solar radiation and spaced to allow the flow of combustion gases. Also, the gas burners 132 are tangentially mounted to provide the hottest part of the flame in the part of cavity 26 in front of tube assembly 116 and directed toward the portions of tubes 150 which intercept solar radiation during solar power operation. In this manner, essentially the same portions of tubes 150 that are active during solar power operation are made active during combustion power operation.

Still further, conical tube array 116, which is composed of the individual tubes 150, is positioned closely adjacent the rear wall part 170 of housing 124 to provide a duct 172 having a restricted flow cross-section to provide higher velocities and increased heat transfer to the aperture-facing portion of tubes 150. Hence, in the embodiment shown in FIG. 2, the combustion gas flow path is from burners 132, past the aperture-facing portions of tubes 150, through duct 172 and finally to exhaust inlet 148, through preheater 136, and out exhaust outlet 140.

As compared to the embodiment in FIG. 1, hybrid receiver 110 has a cone shaped window 160 which would provide less resistance to a tangential swirl flow pattern in cavity 126. A fused silica cone window member may be more expensive to construct than a pyramid assembly of planar window members such as shown in use in the embodiment in FIG. 1, but the cone window would otherwise be preferable.

Hybrid receiver 110 is further equipped with a system of external manifolds 180 which surround housing 124 to intercept thermal energy conducted through walls of housing 124 during gas power operation and transfer the heat energy to incoming combustion air before the combustion air enters preheater 136 at inlet 146. After flowing through preheater 136, where the combustion air receives heat values transferred from the exhaust combustion gases, the combustion air is channeled via outlet 148 to burners 132.

Importantly, manifold system 180 includes not only manifold 182 surrounding the cylindrical wall of housing 124 but also manifold 184 positioned near the surface of aperture cone 186 to intercept heat conducted in the axial direction. Manifold 184 further includes an annular manifold inlet 188 positioned to surround aperture 130 and draw combustion air from the vicinity of the outer surface of window 160. Thus, some of the thermal energy conducted through window 160 during gas power operation and potentially lost to the receiver may be recovered.

It will be apparent to those skilled in the art that various modifications and variations can be made in the improved hybrid solar-combustion powered receiver of the present invention without departing from the scope or spirit of the present invention.

What is claimed is:

1. An improved hybrid solar/combustion powered receiver of the type having an insulated housing with a front end and a rear end, a heat exchanger positioned adjacent the rear housing end for extracting heat energy out of the receiver, the insulated housing surrounding the heat exchanger and forming a receiver cavity, the housing also including an aperture having an aperture axis, said aperture located in the front housing end for admitting solar radiation to the cavity to impinge upon the heat exchanger, and a plurality of gas burners to provide combustion gases within the receiver, the improvement comprising:

(a) the heat exchanger being formed from a plurality of individual adjacent heater pipes arranged in a generally conical array each of the heater pipes being spaced from an adjacent heater pipe, the axis of said conical array being in line with the aperture axis, the conical array arranged such that the solar radiation impinges on a surface of each of the heater pipes;

(b) the gas burners being positioned circumferentially about the axis of said conical heater pipe array for inducing a flow of combustion gases within the receiver cavity along substantially all of the surface of each of the apart heater pipes of said conical array upon which the solar radiation impinges, said gases also passing between the heater pipes, the burners being positioned to cause the hottest part of the burner flame to be located in front of said heater pipe array relative to the aperture, namely between said heater pipe array and the aperture, the combustion gas flow pattern being from the burners, between said heater pipes, and then to a back of said conical array adjacent the rear of the housing within the receiver cavity;

(c) the portion of the rear of the housing within the receiver cavity adjacent said conical array being positioned closely adjacent said array to form a combustion gas flow channel for increasing the velocity of the combustion gas flowing between the heater pipes relative to the combustion gas velocity in the other parts of the combustion gas flow pattern; and (d) means for preventing the escape of combustion gases through the aperture during combustion powered operation to reduce the resultant thermal energy losses through the aperture, wherein the receiver also is of the type having a preheater for preheating combustion air using heat transferred from the exhaust gases during combustion powered operation, the preheater having a combustion air flow path connecting a preheater air inlet with the receiver cavity and an exhaust gas flow path connecting the cavity with a preheater exhaust exit, the improvement further including combustion air manifold means for interconnecting the preheater air inlet and a combustion air source, said manifold means including a plurality of manifold elements positioned on an outside surface of the housing for intercepting and recovering thermal energy conducted through the housing wall during combustion powered operation, including a portion of the housing wall adjacent the aperture, and wherein said means for preventing includes an aperture window, and wherein at least one of said manifold elements has a manifold inlet positioned to draw air from the vicinity of a surface of said window, for cooling said window outside of the receiver cavity.

* * * * *